United States Patent Office 2,987,940
Patented June 13, 1961

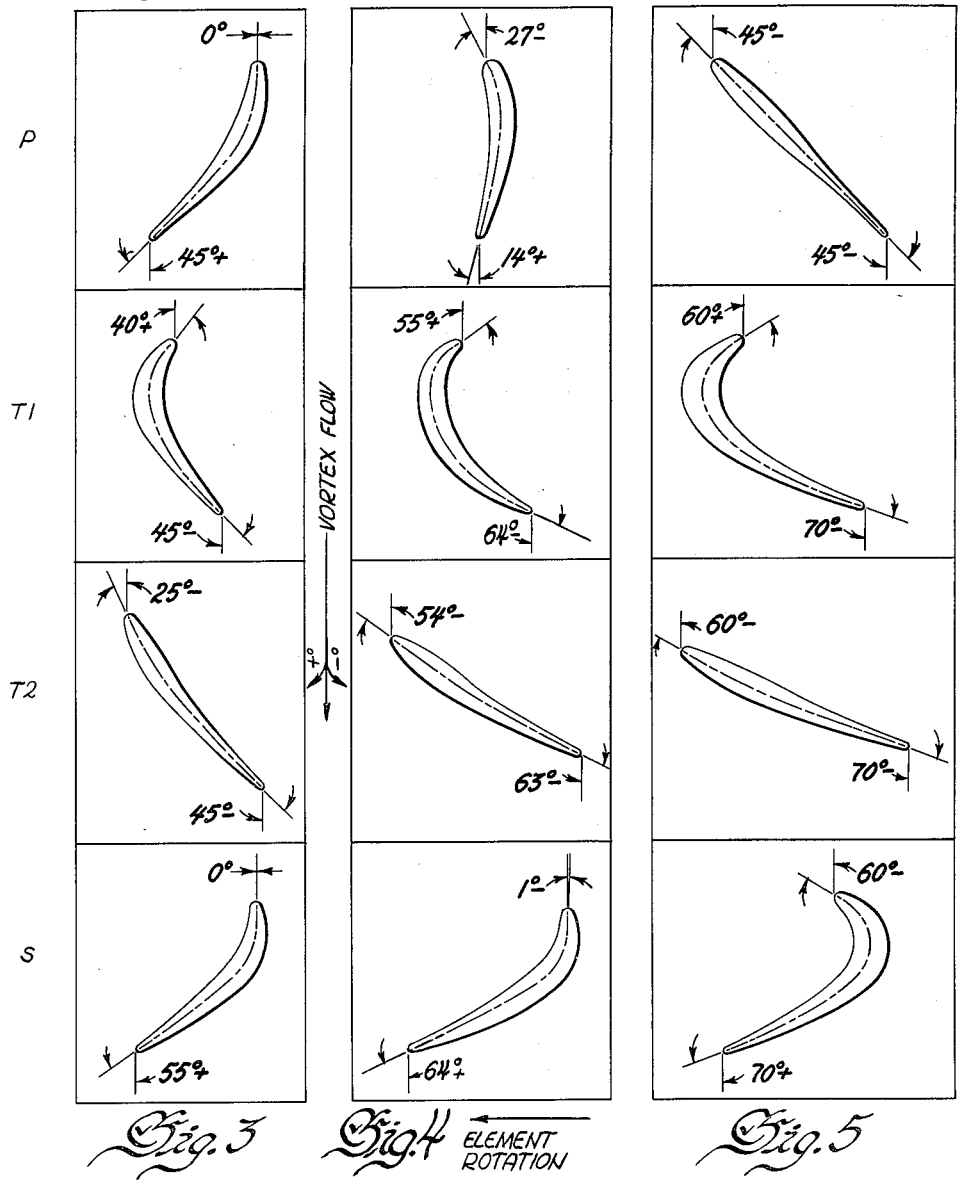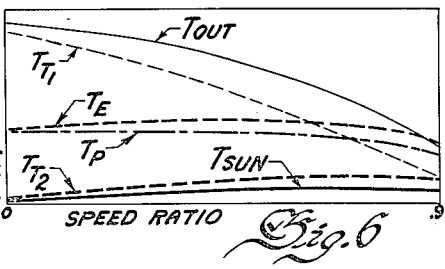

2,987,940
TRANSMISSION
Robert M. Tuck, Indianapolis, and Mark E. Fisher, Carmel, Ind., assignors to General Motors Corporation, Detroit, Mich., a corporation of Delaware
Filed July 22, 1957, Ser. No. 673,392
11 Claims. (Cl. 74—677)

This invention relates to transmissions and more particularly to a combined multi-turbine torque converter and planetary gear drive transmission.

This transmission employs a torque converter having a pump, first turbine, second turbine and one-way stator, which may be of the variable vane type, in combination with a planetary gear unit. The input member is connected to drive the pump of the torque converter and the sun gear of the planetary gear unit. The first turbine drives the output shaft which also carries a carrier and the planetary pinion of the planetary gear unit. The second turbine is connected to the ring gear of the planetary gear unit. The stator is mounted on a one-way brake fixed on the ground sleeve to permit the stator to freewheel during the torque converter coupling stage of operation.

This combination with the preferred torque converter blading and planetary gear unit ratio provides three torque paths having different characteristics over the range of transmission operation. In the first path, the torque delivered by the first turbine to the output shaft is greatest at stall and is gradually reduced as the speed of the first turbine increases as in a conventional converter. In the second path the torque delivered by the second turbine through the ring gear to the output shaft is least at stall and gradually increases with the speed of the output shaft. In the third path the torque delivered direct from the engine flywheel or input shaft through the sun gear to the planetary carrier and output shaft is proportional to the torque delivered by the second turbine. Thus at low output speeds the majority of the power is delivered through the torque converter pump, the first turbine and the gearing to the output. At higher output speeds the torque transmitted through the first turbine is reduced and the power delivered by the second turbine and directly from the input member through the sun gear to the planetary carrier or output increases. This arrangement provides a transmission combination having a wider range of torque converter drive providing high torque multiplication at low speeds and maintaining increased torque multiplication at higher output speeds. The split torque drive in which a portion of the power is transmitted through a direct mechanical drive provides increased efficiency particularly at higher speeds. Changes in the blading and the gear ratio may provide a constant or decreasing amount of torque transmitted through the direct mechanical drive.

An object of the invention is to provide a transmission having a torque converter and planetary gear drive combined to provide high torque multiplication at low speeds and maintain increased torque multiplication at higher speeds by the inherent coaction of the torque converter turbines with the planetary gear unit.

Another object of the invention is to provide a transmission having a combined torque converter and planetary gear drive, a split torque drive in which a low proportion of the output torque is transmitted through a direct mechanical connection at low speeds and, through the inherent coaction of the torque converter turbines and the planetary gear unit, the proportion of output torque transmitted by the direct mechanical connection is increased in accordance with increasing output shaft speed.

Another object of the invention is to provide in a transmission having a multi-turbine torque converter and a planetary gear unit, an input drive connected to the torque converter pump and a sun gear of the planetary gear unit, a first turbine connected to the output shaft and carrier of the planetary gear unit and a second turbine connected to the ring gear.

Another object of this invention is to provide in a transmission having a torque converter and planetary gear unit, a first turbine delivering reduced torque with increasing speed, a second turbine delivering increased torque with increasing speed, a planetary gear unit arranged to connect the first and second turbines and the input shaft to the output shaft to transmit the torque from the first and second turbines to the output shaft and to transmit torque from the input member to the output member in proportion to the torque delivered by the second turbine.

These and other objects of the invention will be more apparent from the following description and drawings of a preferred embodiment.

FIGS. 3, 4 and 5 illustrate a preferred range of torque converter blade angles.

FIG. 6 shows the torque transmitted by elements of the converter plotted against speed ratio.

Figure 1:
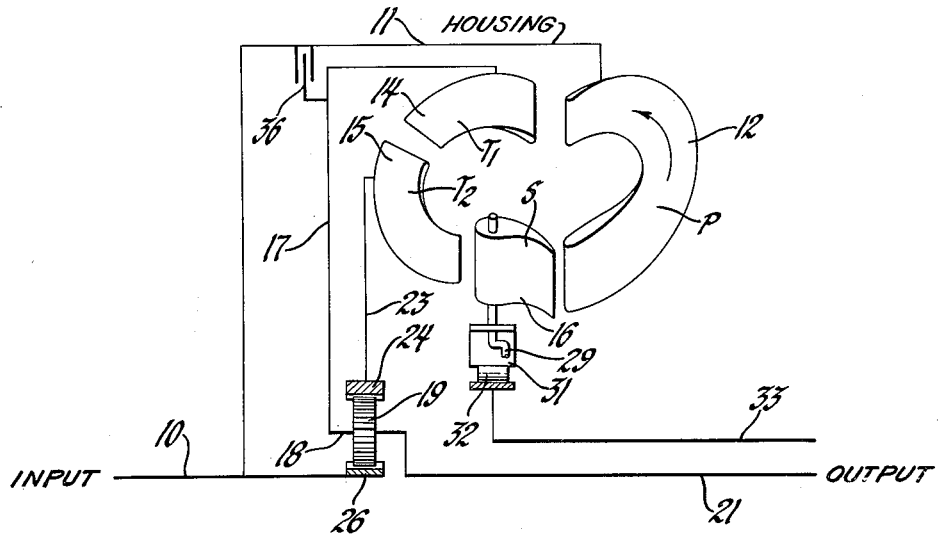
FIGURE 1 shows diagrammatically a torque converter and gearing arrangement.

In the preferred range of embodiments of the invention, illustrated in FIGURE 1, the engine and input member 10 providing torque in accordance with curve TE, FIG. 6, is connected to the torque converter housing 11 which carries the torque converter pump element 12 to provide torque as shown by curve TP. The pump circulates fluid around the torus shaped chamber to the first turbine element 14, the second turbine element 15 and to the stator element 16. The blades of the first turbine element are arranged so that this element delivers maximum torque at stall and then the torque gradually reduces with increasing output speed as shown by curve TT1. The blades of the second turbine element have angles in the preferred range as explained below so that the second turbine delivers minimum torque at stall and the torque delivered gradually increases with increasing speed of the output shaft or second turbine until the maximum torque is transmitted at full speed as shown in curve TT2. The torque curves shown in FIG. 6 are plotted in the conventional manner at constant input speed with torque in foot pounds plotted on the ordinate and input to output speed ratio plotted on the abscissa.

The first turbine 14 is connected by a hub 17 to the carrier 18 which supports the planetary pinions 19 and to the output shaft 21. The second turbine element 15 is connected by a hub 23 to the ring gear 24 meshing with planetary pinions 19 which in turn mesh with the sun gear 26 driven by the input shaft 10. The stator element 16 may have rotatable blades and a control shaft or crank element 29 for varying the vanes of the stator and is mounted on a hub 31 connected by the one-way brake 32 to the ground sleeve 33 formed as a portion of the transmission housing.

In order to obtain the above described preferred type of operation illustrated by the torque curves in FIG. 6 the torque converter elements, the pump 12 or P, the first turbine 14 or T1 the second turbine 15 or T2 and the stator 16 or S have preferred entrance and exit blade angles as illustrated in FIG. 4 and a preferred range of blade angles for each element, the lower limit for the blade angles of each element being illustrated in FIG. 3 and the upper limit in FIG. 5. The section view of the blades and the angles are illustrated in FIGS. 3 to 5 and are shown with respect to the vortex flow path, angles in the direction of element rotation being positive and angles in the opposite direction being negative. Thus the pump blades preferably have an inlet angle of —27° and an exit angle of +14° and a range of inlet angles between 0° and —45° and a range of outlet angles between +45° and —45° as shown in the following table for the pump and other converter elements.

|  | P | T1 | T2 | S |
| --- | --- | --- | --- | --- |
| Preferred inlet angle | —27° | +55° | —54° | —1° |
| Preferred outlet angle | +14° | —64° | —63° | +64° |
| Preferred range of inlet angles | 0° to —45° | +40° to +60° | —25° to —60° | 0° to —60° |
| Preferred range of exit angles | +45° to —45° | —45° to —70° | —45° to —70° | +55° to +70° |

When a torque converter having the preferred blade angles and a planetary gear set having a ratio of approximately 1.5 to 1.6 to 1 the torque of the second turbine will increase with increasing speed ratio to provide a torque converter having the output torque characteristics illustrated in FIG. 6. Similar results may be obtained with similarly correlated combinations of blade angles within the preferred range and gear ratios within the range between 1.4 and 2 to 1, the gear ratio being determined by the conventional formula $S+R/R$ where S is the number of teeth in the sun gear and R is the number of teeth in the ring gear.

In a converter having the preferred range of blade angles and gear ratio, at low output shaft speeds the first turbine 14 delivers a large proportion of the output torque transmitted by the transmission and the second turbine delivers a small proportion of the output torque. Thus at low speeds where high torque multiplication is desired this transmission arrangement provides high torque multiplication and transmits a major portion of the torque or power from the torque converter elements, particularly the first turbine to the output. Due to the fact that the torque transmitted through the direct mechanical connection through the sun gear 26 from input shaft 10 is directly proportional to the torque delivered by the second turbine 15, the torque transmitted through the mechanical connection increases with increasing torque delivered by the second turbine. Since, with increasing output shaft speed, the torque delivered by the first turbine decreases, the torque delivered by the second turbine increases, and the torque delivered by the direct mechanical connection increases, this transmission combination will, with increasing output shaft speed, deliver a proportionately increasing quantity of torque through the direct mechanical connection. Thus at high output speeds, a larger amount of torque is delivered by the direct mechanical connection, providing higher efficiencies approaching that of a direct mechanical connection. Thus it is apparent that in the planetary gear set, the sun gear 26 is a first input member for mechanical drive, the ring gear 24 is a second input member for second turbine drive and the carrier 18 is an output member.

Figure 2:
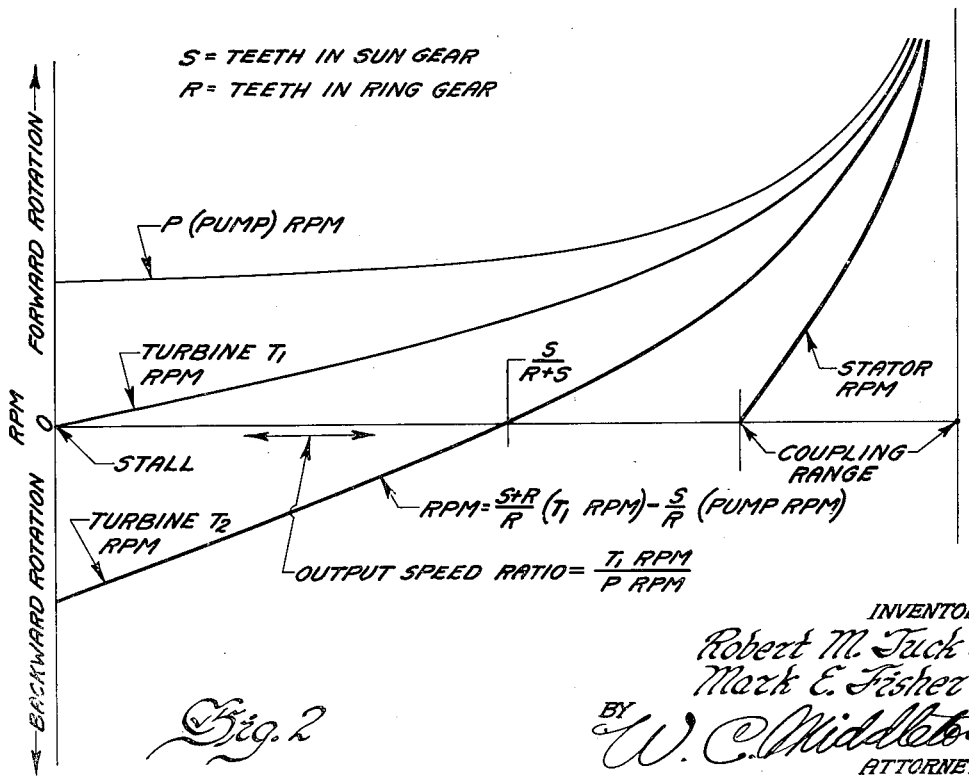
FIGURE 2 shows curves illustrative of the action of this type of converter.

In FIGURE 2 the curves show the speed of each of the elements of a converter of this type. The vertical ordinate of these curves indicates the revolutions per minute of each turbine element while the horizontal abscissa indicates the output speed ratio which is first turbine r.p.m. to pump r.p.m. The curves show that as pump (P) speed increases gradually during the torque converter stage of operation and then increases more rapidly when approaching and during the coupling stage of operation, the first turbine (T1) speed starts at zero since it is connected to the output shaft and then increases during the torque converter range of operation, then increases more rapidly during the coupling range of operation. The second turbine (T2) initially rotates backwardly at the highest rate at stall and with increasing output shaft speed rotates slower and then rotates forwardly until in the coupling stage its speed together with the speed of the first turbine approaches the pump speed. The stator is fixed during the torque converter range and starts rotating in the coupling range and its speed increases rapidly until it approaches the pump speed.

The blade angles and gear ratio may also be correlated in other combinations to provide constant or decreasing torque transmitted by the second turbine and the direct mechanical connection.

The above preferred embodiments of the invention are illustrative of the invention and it will be appreciated that further modification may be made within the scope of the appended claims.

What is claimed is:

1. In a transmission, an input member, an output member, a torque converter having in a fluid chamber a pump circulating fluid in the chamber, a first turbine having blading acted on by the circulating fluid to provide a positive torque in one rotary direction substantially throughout the full range of operation varying from a maximum at converter stall and gradually reducing the torque with increasing output to input speed ratio when substantially constant input torque is supplied to the pump throughout the full operating range, a second turbine having blading acted on by the circulating fluid to provide a positive torque in said one rotary direction substantially throughout the full range of operation varying from a minimum torque at converter stall and gradually increasing the torque with increasing output to input speed ratio when substantially constant input torque is supplied to the pump throughout the full operating range, and stator means, a planetary gear unit having a sun gear, a ring gear and a carrier having pinions thereon meshing with said sun and ring gears, said input member being connected to drive said pump and said sun gear, said first turbine being connected to drive said carrier and said output member, and said second turbine being connected to drive said ring gear to provide a combined torque converter and mechanical drive combining throughout the full range of operation said positive torque of said first turbine and a mechanical drive constantly proportional to said positive torque of said second turbine to provide a combined drive having a greater torque than the individual drives substantially throughout the full range of operation.

2. In a transmission; an input member, an output member, a fluid torque converter including a pump having a series of fluid impelling blades, a primary turbine having a series of blades with an inlet section of one angularity receiving fluid from said pump and an outlet section of reverse angularity providing due to the action of the fluid positive torque in one rotary direction throughout the full range of operation varying from a maximum torque at stall and decreasing torque with increasing output to input speed ratio with substantially constant input pump torque, a secondary turbine having a series of blades having angularity similar to the outlet section of said primary turbine receiving fluid discharged from said outlet section of said primary turbine and providing due to the action of the fluid positive torque in one rotary direction substantially throughout the full range of operation varying from a minimum torque at stall and a gradually increasing torque with increasing output to input speed ratio with substantially constant pump input torque, stator means having blades of reverse angularity to the angularity of the discharge of said secondary turbine receiving fluid discharged from said second turbine and returning the fluid to the intake of said pump, a planetary gear set including a ring gear element, a sun gear element and a carrier element having pinions meshing with said ring and sun gear elements, said input member being connected to said pump and sun gear element, said output member being connected to said carrier element and said primary turbine and said second turbine being connected to said ring gear to provide a split torque drive including a first and second turbine hydraulic positive torque drive always in one direction of rotation combined with a mechanical torque drive transmitting positive mechanical torque always in said one direction of rotation and proportional to the hydraulic torque of the second turbine portion of the hydraulic torque drive to provide a combined drive substantially always having greater torque than the individual drives.

3. In a transmission; an input member, an output member, a fluid torque converter including a pump having a series of fluid impelling blades, a primary turbine having a series of blades with an outlet section of one angularity providing due to the action of the fluid positive torque in one rotary direction throughout the full range of operation varying from a maximum torque at stall and decreasing torque with increasing output to input speed ratio with substantially constant input pump torque, a secondary turbine having a series of blades having angularity similar to the outlet section of said primary turbine receiving fluid discharged from said outlet section of said primary turbine and providing due to the action of the fluid positive torque in one rotary direction substantially throughout the full range of operation varying from a minimum torque at stall and a gradually increasing torque with increasing output to input speed ratio with substantially constant pump input torque, stator means having blades receiving fluid discharged from said second turbine and returning the fluid to the intake of said pump, a planetary gear set including a ring gear element, a sun gear element and a carrier element having pinions meshing with said ring and sun gear elements, said input member being connected to said pump and sun gear element, said output member being connected to said carrier element and said primary turbine and said second turbine being connected to said ring gear to provide a split torque drive including a first and second turbine hydraulic positive torque drive always in one direction of rotation combined with a mechanical drive transmitting positive mechanical torque always in said one direction of rotation proportional to the hydraulic torque of the second turbine portion of the hydraulic torque drive to provide a combined drive substantially always having greater torque than the individual drives.

4. The invention defined in claim 1 and said pump having blades having an inlet angle between 0° and —45° and an exit angle between +45° and —45°, said first turbine having blades having an inlet angle between +40° and +60° and an exit angle between —45° and —70°, a second turbine having blades having an inlet angle between —25° and —60° and an exit angle between —45° and —70°, and a stator having blades having an inlet angle between 0° and —60° and an exit angle between +55° and +70°.

5. In a transmission, an input member, a housing connected to said input member at one end, an output member, a torque converter located in said housing and having a pump with an inlet and an outlet fixed to said housing at the other end, a first turbine having blading with an inlet and an outlet located between said pump and said one end of said housing and having said blading inlet located adjacent said pump outlet providing positive torque in one rotary direction varying from a maximum torque at converter stall and gradually reducing the torque with increasing output speed, a second turbine having blading with an inlet and an outlet located between said pump and said one end of said housing and having said blading inlet adjacent said first turbine blading outlet providing positive torque in said one rotary direction varying from a minimum torque at converter stall and gradually increasing the torque with increasing output speed, and one-way rotatable stator means located between said second turbine blading outlet and said pump inlet, a planetary gear unit located between said pump and said one end of said housing having a sun gear, a ring gear and a carrier having pinions thereon meshing with said sun and ring gears, said input member extending into said housing and being directly connected to drive said sun gear and to drive said housing and thereby drive said pump, said first turbine being directly connected through said carrier to said output member to provide positive torque in said one rotary direction varying from a maximum torque at converter stall and reduced torque at high output member speed by said turbines, and the said second turbine being directly connected to said ring gear to provide positive torque in said one rotary direction varying from a minimum mechanical torque at stall and increased mechanical torque at high output member speed from said input member through said gearing to said output member.

6. A transmission comprising in combination an input member; a final output member; a fluid torque transmitting device including first driving turbine means and second driving turbine means for transmitting torque by fluid connection from said input member to said intermediate torque transmitting members, said first driving turbine means having the characteristic of transmitting positive torque in one rotary direction which torque progressively decreases its ratio to input torque as the speed of the first turbine increases throughout the operating range of the transmission, said second driving turbine means having the characteristic of transmitting a positive torque in one rotary direction throughout the operating range of the transmission; a reaction member; and means including connecting means independently connecting said first turbine to the final output member for delivering to the output member fluid transmitted torque which progressively decreases its ratio to input torque as the speed of the output member increases, and gear means connecting the input member and said second turbine to drive the final output member for delivering to the output member second turbine torque and mechanically transmitted torque which mechanically transmitted torque is proportional to the torque of the second turbine.

7. In a transmission, an input member, an output member, a fluid torque converter having in a fluid chamber a pump driven by said input member and circulating fluid in said chamber, a first turbine having drive blading means acted on by the circulating fluid, said drive blading means having a configuration providing a positive torque in one rotary direction substantially throughout the full range of transmission operation varying from a maximum at converter stall and gradually reducing the torque with increasing output to input speed ratio when substantially constant input torque is supplied to the pump throughout the full transmission operating range, a second turbine having drive blading means acted on by the circulating fluid, said drive blading means having a configuration providing a positive torque in one rotary direction substantially throughout the full range of transmission operation varying from a minimum torque at converter stall and gradually increasing the torque with increasing output to input speed ratio when substantially constant input torque is supplied to the pump throughout the full transmission operating range, and stator means, and output drive gear means connecting said input member and second turbine to drive said output member with positive torque in one direction of rotation varying from a minimum at coverter stall and increasing substantially throughout the full range of transmission operation to a maximum at high output speeds, and output drive means independently connecting said first turbine with said output member to provide fluid torque transmission to drive said output member with positive torque in said last mentioned one direction of rotation varying from a maximum at converter stall and reducing substantially throughout the full range of transmission operation to a minimum at high speed ratios to provide a combined drive having a greater torque than the individual drives substantially throughout the full range of transmission operation.

8. In a transmission, an input member, an output member, a torque converter having in a fluid chamber a pump driven by said input member and circulating fluid in the chamber, a first turbine having drive blading means acted on by the circulating fluid to provide a positive torque in one rotary direction substantially throughout the full range of transmission operation varying from a maximum at converter stall and gradually reducing the torque with increasing output to input speed ratio when substantially constant input torque is supplied to the pump throughout the full transmission operating range, a second turbine having drive blading means acted on by the circulating fluid to provide a positive torque in one rotary direction substantially throughout the full range of transmission operation varying from a minimum torque at converter stall and gradually increasing the torque with increasing output to input speed ratio when substantially constant input torque is supplied to the pump throughout the full transmission operating range, and stator means, and means including an output drive connection means connecting said first turbine to said output member and output drive gear means connecting said second turbine and said input member to drive said output member to provide positive fluid torque transmission from said input member to said pump and through said first turbine to drive said output member in one direction of rotation with fluid transmitted torque varying from a maximum at converter stall and reducing substantially throughout the full range of transmission operation to a minimum at high speed ratio, and fluid and gear torque transmission from said input member to said pump through said second turbine and from said input member through said gear means to drive said output member in said last mentioned one direction of rotation with fluid and gear transmitted torque varying from a minimum at converter stall and increasing substantially throughout the full range of transmission operation to a maximum at high speed ratios to provide a combined drive having a greater torque than the individual drives substantially throughout the full range of transmission operation.

9. In a transmission; an input member; an output member; a torque converter having in a fluid chamber a pump driven by said input member and circulating fluid in said chamber; first turbine means having blading acted on by the circulating fluid to provide a positive torque in one rotary direction substantially throughout the full range of operation varying from a maximum at converter stall and gradually reducing the torque with increasing output to input speed ratio when constant input torque is supplied to the pump throughout the full transmission operating range; a second turbine having blading acted on by the circulating fluid to provide a positive torque in one rotary direction substantially throughout the full range of transmission operation varying from a minimum torque at converter stall and gradually increasing the torque with increasing output to input speed ratio when substantially constant input torque is supplied to the pump throughout the full transmission operating range; and stator means; and planetary gear means including a first input gear element, a second input gear element, an output element, a connection connecting said input member to drive said pump member and said first input element, a connection connecting said first turbine means to drive said output element, a connection connecting said second turbine means to drive said second input element, and connections connecting said output member to said first turbine means to provide a combined torque converter and mechanical drive combining throughout the full range of transmission operation the positive fluid drive substantially always in one direction of rotation of one of said turbine means and a positive mechanical drive substantially always in said one direction of rotation proportional to the other turbine drive to provide a combined drive having a greater torque than the individual drives substantially throughout the full range of operation.

10. In a transmission; an input member; an output member; a fluid torque converter including a pump having a series of fluid impelling blades; a first turbine having a series of blades and having the characteristic of transmitting positive torque in one rotary direction which torque progressively decreases its ratio to input torque as the ratio of output to input speed increases through the transmission operating range; a second turbine having a series of blades and having the characteristic of transmitting a positive torque in one rotary direction throughout the transmission operating range; stator means having blades; and gear means including a first input element, a second input element and an output element, said input member being connected to said pump and first input element, said output member being connected to said output element and one of said turbines and the other of said turbines being connected to said second input element to provide a split torque drive including a first and second turbine hydraulic positive torque drive always in one rotary direction combined with a mechanical torque drive transmitting positive mechanical torque always in said one rotary direction and proportional to the hydraulic torque of said other of said turbines of the hydraulic torque drive to provide a combined drive always having a torque at least as large as one of the individual drives and equal to the individual drives.

11. In a transmission; an input member; an output member; a fluid torque converter including a pump having a series of fluid impelling blades; a primary turbine having a series of blades having an outlet section providing due to the action of the fluid positive torque in one rotary direction throughout the full range of transmission operation varying from a maximum torque at stall and decreasing torque with increasing output to input speed ratio with substantially constant input pump torque; a second turbine having a series of blades having an angular position similar to said outlet section of said blades of the primary turbine providing due to the action of the fluid positive torque in said one rotary direction substantially throughout the full range of transmission operation varying from a minimum torque at stall and a gradually increasing torque with increasing output to input speed ratio with substantially constant pump input torque; stator means having blades; and planetary gear means including a first input element, a second input element, an output element, a connection connecting said input member to said pump and said first input element, a connection connecting said output member to said output element and one of said turbines and a connection connecting the other of said turbines to said second input element to provide a split torque drive including a first and second turbine hydraulic position torque drive always in one rotary direction combined with a mechanical torque drive transmitting positive mechanical torque always in said one rotary direction and proportional to the hydraulic torque of said other of said turbines of the hydraulic torque drive to provide a combined drive substantially always having greater torque than the individual drives.

References Cited in the file of this patent
UNITED STATES PATENTS

| 2,187,937 | De Lavaud | Jan. 23, 1940 |
| 2,235,672 | Dodge | Mar. 18, 1941 |
| 2,616,309 | Russell | Nov. 4, 1952 |
| 2,685,169 | Saives | Aug. 3, 1954 |
| 2,803,974 | Kelley | Aug. 27, 1957 |